Nov. 15, 1927.  1,649,770

T. W. MILLER
ORNAMENTED RUBBER ARTICLE
Filed Feb. 18, 1927

Thomas W. Miller
INVENTOR
By Smith and Freeman
ATTORNEYS

Patented Nov. 15, 1927.

1,649,770

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

ORNAMENTED RUBBER ARTICLE.

Application filed February 18, 1927. Serial No. 169,262.

My invention relates to ornamented rubber articles, and the principal object of my invention is to provide a new and improved article of this type. In the drawings accompanying this specification and forming a part of this application I have shown, for purposes of illustration, one form which my invention may assume, and in these drawings:

Figure 3 is a section on the line 3—3 of Figures 1 and 2, while

Figure 1:
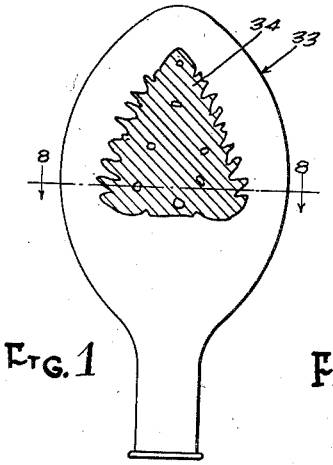
Figure 1 is a front elevation of this form of my invention.
Figure 2:
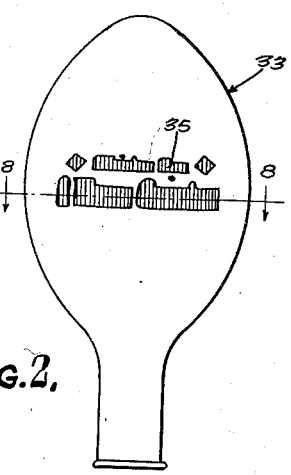
Figure 2 is a rear elevation of the embodiment shown in Figure 1.
Figure 3:
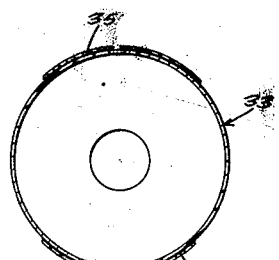
Figure 4:
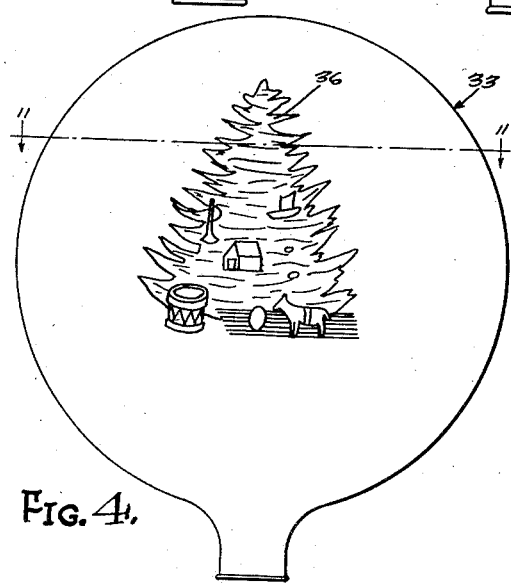
Figure 5:
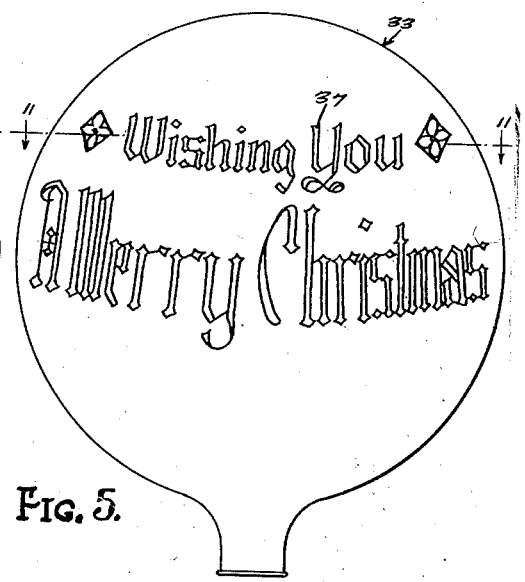
Figure 6:
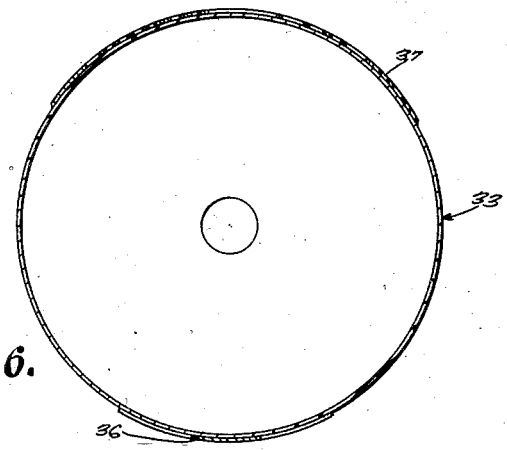

Figures 4 through 6 are views of the embodiment shown in Figures 1 through 3 similar to Figures 1 through 3 but showing the embodiment expanded.

In Figures 1 through 6 I have shown my invention embodied in a toy balloon 33 provided on one side with an ornamentation 34, and on the other side with an ornamentation 35, adapted to form, upon expansion of the balloon 33, respectively the representation 36 of a present-laden Christmas tree and the representation 37 of a suitable Christmas greeting, the ornamentation being formed by a multiplicity of particles of floc secured to the balloon 33 by means of a thin coating of rubber cement embedding the ends of the floc particles, and vulcanized to the balloon 33, to thus hold the ornamentation 34 and 35 firmly secured vulcanized to the balloon 33.

In actual practice I find it convenient to secure the floc particles in this position by applying the rubber cement to the balloon 33 in the design which the ornamentation is to assume, and to then apply the floc particles by dusting them over the general area of the ornamentation, both the area of the design covered by the rubber cement and to which the particles will adhere, and the portions of the general area not covered by the rubber cement and from which the particles will slide, and to then vulcanize the rubber cement with the floc particles adhering thereto, the vulcanization being accomplished in any desired manner, as by open cold cure, or by hot cure under a slight pressure often desirable to embed the floc particles more firmly in the cement.

It will of course be understood that where I apply the floc in two different colors, as in the embodiment disclosed herein, I may either apply the rubber cement for the entire design and take care that the floc particles of the two colors do not mix, or I may apply the two parts of the design in two successive operations, the latter being ordinarily more economical.

It will of course be apparent that in any event the floc after the vulcanizing is secured embedded in the thin coating formed by the rubber cement securely vulcanized to the balloon in the desired design.

In the embodiment of my invention herein shown the ornamentation may be applied either by applying to the collapsed balloon a design which will produce the desired design when the balloon is expanded, or by applying the desired design to the balloon when the balloon is in expanded condition.

From the above description it will be obvious to those skilled in the art that the embodiment of my invention herein shown and described provides a new and improved ornamented rubber article, and accordingly, that this embodiment of my invention accomplishes at least the principal object of my invention.

At the same time it will also be obvious to those skilled in the art that the particular embodiment of my invention herein shown and described may be variously changed and modified without departing from the spirit of my invention or sacrificing the advantages thereof, and it will therefore be understood that the disclosure herein is illustrative only, and that my invention is not limited thereto.

I claim:

1. An ornamented rubber article comprising an expansible sheet-rubber body, and ornamentation thereon comprising a multiplicity of tiny particles arranged on said body to be in a desired design when said body is expanded, and held firmly united with said body vulcanized to said body.

2. An ornamented rubber article comprising an expansible sheet-rubber body, and ornamentation thereon comprising a multiplicity of tiny fibrous particles arranged on said body to be in a desired design when said body is expanded, and held firmly united with said body vulcanized to said body.

3. An ornamented rubber article comprising an expansible sheet-rubber body, and ornamentation thereon comprising a multiplicity of tiny particles arranged on said body to be in a desired design when said body is expanded, and held firmly united with said body embedded in a rubber coating vulcanized to said body.

4. An ornamented rubber article comprising an expansible sheet-rubber body, and ornamentation thereon comprising a multiplicity of tiny fibrous particles arranged on said body to be in a desired design when said body is expanded, and held firmly united with said body embedded in a rubber coating vulcanized to said body.

In testimony whereof I hereunto affix my signature.

THOMAS W. MILLER.